US010284975B2

(12) United States Patent
Higgins et al.

(10) Patent No.: US 10,284,975 B2
(45) Date of Patent: May 7, 2019

(54) SELF-FITTING IN-CANAL COMPONENT AND HEARING ASSISTANCE DEVICE

(71) Applicant: Starkey Laboratories, Inc., Eden Prairie, MN (US)

(72) Inventors: Sidney A. Higgins, Maple Grove, MN (US); David Tourtelotte, Eden Prairie, MN (US); Beau Jay Polinske, Minneapolis, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 19 days.

(21) Appl. No.: 15/396,239

(22) Filed: Dec. 30, 2016

(65) Prior Publication Data
US 2017/0195808 A1 Jul. 6, 2017

Related U.S. Application Data

(60) Provisional application No. 62/274,771, filed on Jan. 4, 2016.

(51) Int. Cl.
*H04R 25/00* (2006.01)
*H04R 1/10* (2006.01)
*B29C 35/08* (2006.01)

(52) U.S. Cl.
CPC ......... *H04R 25/652* (2013.01); *H04R 1/1058* (2013.01); *B29C 35/0805* (2013.01); *B29C 2035/0827* (2013.01); *H04R 25/658* (2013.01); *H04R 2225/023* (2013.01); *H04R 2460/17* (2013.01)

(58) Field of Classification Search
CPC .... H04R 25/65; H04R 25/652; H04R 25/658; H04R 2225/021; H04R 2225/77
See application file for complete search history.

(56) References Cited

U.S. PATENT DOCUMENTS

| 4,962,537 | A | * | 10/1990 | Basel | ............... | H04R 25/658 |
|---|---|---|---|---|---|---|
| | | | | | | 381/324 |
| 5,045,266 | A | | 9/1991 | Moro | | |
| 5,321,757 | A | | 6/1994 | Woodfill, Jr. | | |
| 5,333,622 | A | | 8/1994 | Casali et al. | | |
| 5,868,708 | A | | 2/1999 | Hart et al. | | |
| 6,473,512 | B1 | | 10/2002 | Juneau et al. | | |

(Continued)

FOREIGN PATENT DOCUMENTS

| CN | 106941652 A | 7/2017 |
|---|---|---|
| GB | 2203379 A | 10/1988 |

(Continued)

OTHER PUBLICATIONS

"European Application Serial No. 17150198.4, Extended European Search Report dated May 15, 2017", 9 pgs.

*Primary Examiner* — Brian Ensey
*Assistant Examiner* — Ryan Robinson
(74) *Attorney, Agent, or Firm* — Schwegman Lundberg & Woessner, P.A.

(57) ABSTRACT

The present disclosure relates to methods and apparatus for constructing and fitting a component that is designed to be worn at least partially within an ear canal. The methods and apparatus may be used in hearing aids such as receiver-in-canal hearing aids and completely-in-canal hearing aids. The techniques may also be use in constructing and fitting other devices including audio earbuds and ear plugs.

18 Claims, 1 Drawing Sheet

(56) References Cited

U.S. PATENT DOCUMENTS

| | | | | |
|---|---|---|---|---|
| 6,695,943 B2* | 2/2004 | Juneau | ............... | C07D 493/10 |
| | | | | 156/245 |
| 6,754,357 B2* | 6/2004 | McIntosh | ............ | H04R 25/658 |
| | | | | 381/322 |
| 8,798,294 B2* | 8/2014 | Havenith | ............ | H04R 25/505 |
| | | | | 381/312 |
| 2006/0188119 A1* | 8/2006 | Parker | ............... | H04R 25/608 |
| | | | | 381/322 |
| 2012/0057740 A1* | 3/2012 | Rosal | .................... | H04R 25/65 |
| | | | | 381/380 |
| 2016/0317352 A1* | 11/2016 | Blumer | ................. | A61F 11/08 |
| 2017/0311069 A1* | 10/2017 | Prevoir | .............. | H04R 1/1016 |

FOREIGN PATENT DOCUMENTS

| | | |
|---|---|---|
| JP | 07313601 A | 12/1995 |
| WO | WO-2015179975 A1 | 12/2015 |

* cited by examiner

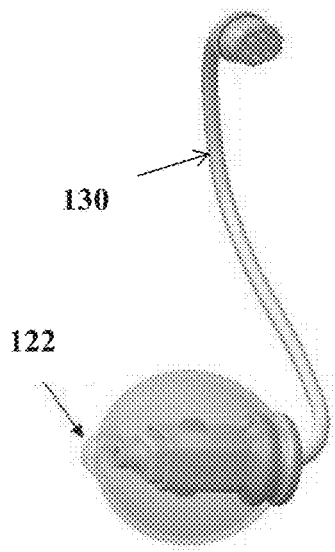
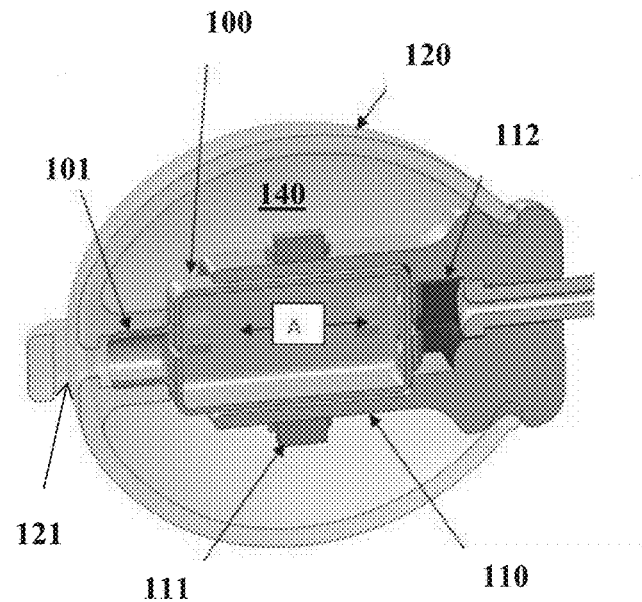
Fig. 1A
Fig. 1B
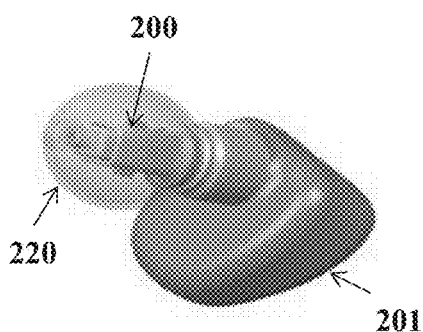
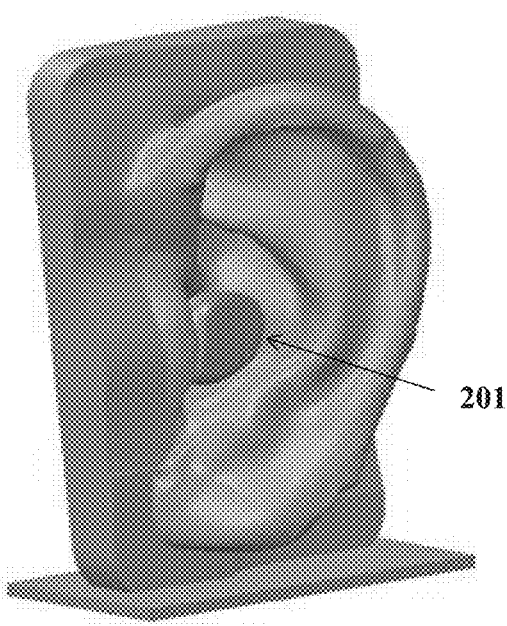
Fig. 2A
Fig. 2B

SELF-FITTING IN-CANAL COMPONENT AND HEARING ASSISTANCE DEVICE

CROSS-REFERENCE TO RELATED APPLICATION

This patent application claims the benefit of U.S. Provisional Patent Application No. 62/274,771, filed Jan. 4, 2016, entitled "SELF-FITTING IN-CANAL COMPONENT FOR HEARING ASSISTANCE DEVICES USING SAME", which is incorporated by reference herein in its entirety.

BACKGROUND

Hearing assistance devices include a variety of ear-level devices that assist or aid hearing of a wearer. Such apparatus may be worn partially or fully on the ear and/or in the ear. In the example of apparatus worn at least partially in the ear, the device must either employ a standard fit component that typically comes in a predetermined range of suitable sizes or it must be custom fit to the ear canal of the wearer. Devices requiring an accurate and close fit are typically custom fitted to the wearer's ear or ear canal. Such devices include completely-in-the canal (CIC) and receiver-in-canal (RIC) hearing aids which are shaped to fit a particular wearer's ear canal. However, there are a number of devices that may benefit from custom fitting to match the geometry of the ear canal other than hearing aids.

BRIEF DESCRIPTION OF THE DRAWINGS

FIGS. 1A and 1B illustrate a receiver for a receiver-in-canal hearing aid according to some embodiments.

FIGS. 2A and 2B illustrate a generic hearing device according to some embodiments.

DETAILED DESCRIPTION

One disadvantage of custom fitted devices is that, to make the custom device, an ear impression or earmold is taken and processed to construct the housing of the device. For devices that are worn at least partially in the ear canal, it is advantageous to take an impression of the ear canal and to generate the custom fitted portion using that impression. But such impressions and processing of earmolds can take a significant amount of time. The ear impressions must be made, sent to a facility, and processed to create the custom fitted piece. This can add delays and require repeated office visits which are also time consuming and costly. It can also require one or more specially trained professionals, further increasing the cost.

There is a need in the art for a rapid system for generating custom fitted in-canal devices for hearing assistance devices. The present disclosure relates to apparatus for a component that fits at least partially within an ear canal and for fitting it to at least a portion of the ear canal. The disclosed subject matter also includes hearing assistance devices employing the self-fitting design of the present patent application. In various examples, the system can be used by a technician or assistant in the field to assist the wearer to rapidly fit the device to her own ear canal. In various examples, the system may be used by the wearer to fit her own device with little or no assistance.

The following detailed description of the present subject matter refers to subject matter in the accompanying drawings which show, by way of illustration, specific aspects and embodiments in which the present subject matter may be practiced. These embodiments are described in sufficient detail to enable those skilled in the art to practice the present subject matter. References to "an", "one", or "various" embodiments in this disclosure are not necessarily to the same embodiment, and such references contemplate more than one embodiment. The following detailed description is demonstrative and not to be taken in a limiting sense. The scope of the present subject matter is defined by the appended claims, along with the full scope of legal equivalents to which such claims are entitled.

The present subject matter provides apparatus and processes for a self-fitting of a component for an ear or ear canal of the wearer. It is being demonstrated as a self-fitted earbud of a hearing assistance device, but the invention is not limited to earbuds or even hearing aids. The present technology can be used to custom fit a device for a variety of device applications and for a variety of anatomical uses.

In some embodiments, the present subject matter uses an elastomeric sleeve that encloses a material that can be cured or fixed using light, for example ultraviolet light. It is understood that different light wavelengths, sources and applications may be used without departing from the scope of the present subject matter.

In one example shown in FIGS. 1A and 1B, a receiver for a receiver-in-the canal hearing aid is fitted to the wearer by inserting the earbud having a soft sleeve into the ear canal a suitable distance, and then illuminating the earbud's material enclosed in its sleeve to allow the material to cure. In other examples, a completely-in-the canal hearing aid is fitted to the ear canal of a wearer using a sleeve and curing the material in the soft sleeve. These examples are not exhaustive, and it is understood that yet other applications are contemplated by those of skill in the art upon understanding the present subject matter.

FIG. 1A shows a perspective view of a receiver 100 slideably mounted within a slip housing 110 and covered by an elastomeric sleeve 120. FIG. 1B shows these components in cross-section. The slip housing 110 is connected at its distal end to the sleeve 120. The receiver 100 connects via wires at its distal end to a cable 130 that is used to electrically connect the receiver to a microphone and audio processing circuitry contained in a separate housing that is typically adapted to be worn behind a user's ear. A spout 101 at the proximal end of the receiver conveys sound produced by a speaker element within the receiver to the outside. The spout 101 is bonded to an acoustic port 121 of the sleeve 120 for conveying sound into the user's ear. The acoustic port 121 is covered by a wax bridge 122 to prevent ear wax ingress. A light-curable material 140 (e.g., a photopolymer) is contained within the sleeve 120 and surrounds the receiver 100 and slip housing 110. Mounted on the slip housing 110 are one or more light emitting elements 111 (e.g., ultraviolet light emitting diodes (LEDs)) that are used to cure the light-curable material. The light emitting elements may be energized from an external source or from a source within the housing containing the microphone and audio processing circuitry via wires at the distal end of the receiver 100. The wires at the distal end of the receiver 100 are contained within a wire cavity 112 of the slip housing 110 which allows the wires to slacken and extend as the receiver 100 slides within the slip housing 110 along a proximal to distal axis.

In one embodiment, the soft elastomeric sleeve 120 is filled with a UV cure photopolymer 140. In various examples, a portion of the space inside of the elastomeric sleeve 120 is filled with the UV cure photopolymer 140, or the entire space inside the elastomeric sleeve is filled with the photopolymer. In its uncured state the photopolymer is in liquid form. This allows it to conform to the shape and bend of the ear canal during insertion.

As demonstrated by FIG. 1B, the interface of the receiver 100 to the slip housing 110 is designed to allow the receiver to move in the "A" direction (i.e., along the proximal to distal axis) freely as the sleeve 120 and photopolymer is constricted during insertion into the ear. The spout 101 is bonded to the sleeve 120 at the proximal end while a service loop of wires in the wire cavity 112 affords freedom of movement along the linear axis. This action allows the sleeve 120 to conform and extend deeper into the ear canal without the need for an overflow reservoir and reduces the overall pressure on the canal walls while ensuring a tight fit. Since the metal spout is bonded inside the acoustic port, no occlusion should occur as a result of these forces.

In this example, the aft or distal portion of the slip housing is configured to align with the aperture of the ear canal when full insertion depth has been obtained. Once in this position, power is applied for a relatively short amount of time (e.g., 1 minute) to the light emitting elements (e.g., a plurality of UV LEDs attached at 90 degree intervals around the slip housing). In one example, 4 LED's are used, however, it is understood that the number and configuration of light generating materials may vary without departing from the present subject matter. In an optional application, once the photopolymer is cured, the LEDs (or other light sources) can be used as indicator lights if desired. That is, the LEDs can be re-accessed and used independently or in sets to function as indicator lights after curing of the photopolymer.

In various embodiments, the cured polymer will not adhere to the sleeve. This permits slight movement of the ear canal (due to jaw movement) without causing irritation against a rigid polymer. Slight slippage between the sleeve and cured photopolymer softens any sharp and rigid transition found in the cured internal form. This also eliminates a shear condition between the sleeve and the rigid cured polymer that could endanger service life of the product. It should also be noted that this same action may minimize the effect of acoustic slit leaks.

FIGS. 2A and 2B demonstrate applications of the present approach to another ear level device. The hearing device 200 of FIGS. 2A and 2B is covered by an elastomeric sleeve 220 and can be custom fit using the process described above for the soft sleeve and receiver of FIGS. 1A and 1B. FIG. 2B shows a distal end 201 of the device 200 being flush with the ear canal opening after insertion. The hearing device 200 may be a hearing aid, or it may be a device such as a wireless headset or in ear monitor.

One of the advantages of fitting such devices with this approach is that the in-canal portion of the hearing device can be custom fitted with the electronics portion connected to the in-canal portion and while in an actual use position. This achieves a fit that accounts for the weight and shape of the entire hearing aid in its use position within the particular geometry of the wearer's ear. Such designs may provide a superior custom fit for a wearer.

In alternate applications of the present subject matter the ear mold can be used to take a simple ear canal impression. That simple impression may be sent to a manufacturing facility to create the final custom product. This application allows for simple and safe ear canal (or other anatomy) impressions that can be used for creation of a custom fit product.

The present subject matter can be used to produce a vented device. In various embodiments the present subject matter consists of a back vented tweeter woofer device.

In alternate applications, this fitting approach can be used to make custom fitted ear plugs, such as for swimming or hunting. Other applications include custom fitted health monitors and custom fitted listening devices for the exercise community. Other custom fitted applications include, but are not limited to devices for military uses, first responders, sporting events, industrial uses, video garners, and/or for other hearable or hearing aid device.

In various embodiments, the present subject matter provides a fitting apparatus and method that does not require office visits or formal ear impressions. In various embodiments, the product is self-contained because it allows for the UV source, transducer(s), and photopolymer to be contained within the elastomeric sleeve.

In various embodiments, once the material is cured the sleeve does not stick to the cured internal rigid form which affords greater comfort by adapting to changing canal shape due to factors such as jaw movement, humidity, and health of the wearer. The design creates a linear expansion feature that directs any constriction pressures to elongate the sleeve without collapsing the acoustic port (when one is present). This design also maintains a constant reduced pressure force on the canal walls.

The invention can be used with a variety of hearing assistance device types. Hearing assistance devices typically include at least one enclosure or housing, a microphone, hearing assistance device electronics including processing electronics, and a speaker or "receiver." Hearing assistance devices may include a power source, such as a battery. In various embodiments, the battery may be rechargeable. In various embodiments multiple energy sources may be employed. It is understood that in various embodiments the microphone is optional. It is understood that in various embodiments the receiver is optional. It is understood that variations in communications protocols, antenna configurations, and combinations of components may be employed without departing from the scope of the present subject matter. Antenna configurations may vary and may be included within an enclosure for the electronics or be external to an enclosure for the electronics. Thus, the examples set forth herein are intended to be demonstrative and not a limiting or exhaustive depiction of variations.

It is understood that digital hearing aids include a processor. In digital hearing aids with a processor, programmable gains may be employed to adjust the hearing aid output to a wearer's particular hearing impairment. The processor may be a digital signal processor (DSP), microprocessor, microcontroller, other digital logic, or combinations thereof. The processing may be done by a single processor, or may be distributed over different devices. The processing of signals referenced in this application can be performed using the processor or over different devices. Processing may be done in the digital domain, the analog domain, or combinations thereof. Processing may be done using subband processing techniques. Processing may be done using frequency domain or time domain approaches. Some processing may involve both frequency and time domain aspects. For brevity, in some examples drawings may omit certain blocks that perform frequency synthesis, frequency analysis, analog-to-digital conversion, digital-to-analog conversion, amplification, buffering, and certain types of filtering and processing. In various embodiments the processor is adapted to perform instructions stored in one or more memories, which may or may not be explicitly shown. Various types of memory may be used, including volatile and nonvolatile forms of memory. In various embodiments, the processor or other processing devices execute instructions to perform a number of signal processing tasks. Such embodiments may include analog components in communication with the processor to perform signal processing tasks, such as sound reception by a microphone, or playing of sound using a receiver (i.e., in applications where such transducers are used). In various embodiments, different realizations of the block diagrams, circuits, and processes set forth herein can be created by one of skill in the art without departing from the scope of the present subject matter.

Various embodiments of the present subject matter support wireless communications with a hearing assistance device. In various embodiments the wireless communications can include standard or nonstandard communications. Some examples of standard wireless communications include, but not limited to, Bluetooth™, low energy Bluetooth, IEEE 802.11 (wireless LANs), 802.15 (WPANs), and 802.16 (WiMAX). Cellular communications may include, but not limited to, CDMA, GSM, ZigBee, and ultra-wideband (UWB) technologies. In various embodiments, the communications are radio frequency communications. In various embodiments the communications are optical communications, such as infrared communications. In various embodiments, the communications are inductive communications. In various embodiments, the communications are ultrasound communications. Although embodiments of the present system may be demonstrated as radio communication systems, it is possible that other forms of wireless communications can be used. It is understood that past and present standards can be used. It is also contemplated that future versions of these standards and new future standards may be employed without departing from the scope of the present subject matter.

The wireless communications support a connection from other devices. Such connections include, but are not limited to, one or more mono or stereo connections or digital connections having link protocols including, but not limited to 802.3 (Ethernet), 802.4, 802.5, USB, ATM, Fibre-channel, Firewire or 1394, InfiniBand, or a native streaming interface. In various embodiments, such connections include all past and present link protocols. It is also contemplated that future versions of these protocols and new protocols may be employed without departing from the scope of the present subject matter.

In various embodiments, the present subject matter is used in hearing assistance devices that are configured to communicate with mobile phones. In such embodiments, the hearing assistance device may be operable to perform one or more of the following: answer incoming calls, hang up on calls, and/or provide two way telephone communications. In various embodiments, the present subject matter is used in hearing assistance devices configured to communicate with packet-based devices. In various embodiments, the present subject matter includes hearing assistance devices configured to communicate with streaming audio devices. In various embodiments, the present subject matter includes hearing assistance devices configured to communicate with Wi-Fi devices. In various embodiments, the present subject matter includes hearing assistance devices capable of being controlled by remote control devices.

It is further understood that different hearing assistance devices may embody the present subject matter without departing from the scope of the present disclosure. The devices depicted in the figures are intended to demonstrate the subject matter, but not necessarily in a limited, exhaustive, or exclusive sense. It is also understood that the present subject matter can be used with a device designed for use in the right ear or the left ear or both ears of the wearer.

The present subject matter may be employed in hearing assistance devices, such as hearing aids, headsets, headphones, and similar hearing devices. The present subject matter may be employed in hearing assistance devices having additional sensors. Such sensors include, but are not limited to, magnetic field sensors, telecoils, temperature sensors, accelerometers and proximity sensors.

The present subject matter is demonstrated for hearing assistance devices, including hearing aids, including but not limited to, behind-the-ear (BTE), in-the-ear (ITE), in-the-canal (ITC), receiver-in-canal (RIC), completely-in-the-canal (CIC), or invisible-in-the-canal (IIC) type hearing aids. It is understood that behind-the-ear type hearing aids may include devices that reside substantially behind the ear or over the ear. Such devices may include hearing aids with receivers associated with the electronics portion of the behind-the-ear device, or hearing aids of the type having receivers in the ear canal of the user, including but not limited to receiver-in-canal (RIC) or receiver-in-the-ear (RITE) designs. The present subject matter can also be used in deep insertion devices having a transducer, such as a receiver or microphone. The present subject matter can be used in devices whether such devices are standard or custom fit and whether they provide an open or an occlusive design. It is understood that other hearing assistance devices not expressly stated herein may be used in conjunction with the present subject matter.

Although the example shown here is intended to demonstrate how a device can be custom fitted to an ear canal of a wearer, it is also contemplated that the present subject matter could be used in applications where the device conforms to only a portion of the canal geometry. This is envisioned not only in fitting to a portion of the canal length but to a portion of the diameter of the canal. This allows configurations of hearing aids to be conformed to, for example, bends or other anatomically complex geometries. It allows for the hearing aid to be designed as an occlusive or nonocclusive custom fit for a particular wearer. The present subject matter also allows for motion of internal components of the fitted device until they are in position. This allows for in-situ fixation of the components in a desired or beneficial configuration when the internal material of the device is cured. For example, the present subject matter can allow for movement of components, such as antennae or wires, to fit the device for the wearer. In embodiments where the sleeve can move with respect to the inner cured material, the ultimate design allows for even more comfort and flexibility to a wearer, especially in cases where the ear anatomy can vary over time. Accordingly, the present subject matter can be used in a variety of custom fit applications.

In various applications, the device can be fitted to the wearer by a technician. In various embodiments, the device can be fit by the wearer herself. In yet other embodiments a combination of persons can be employed. In yet additional embodiments the fitting may be done remotely. Still other approaches may be used, such as fitting when a desired sound metric or goal is achieved. Various combinations of these examples may be used to fit the device. The examples given herein are not intended to be exhaustive or exclusive of the scope of the present subject matter.

Additional Notes and Examples

In Example 1, a device for inserting into the ear canal of a wearer, comprises: a body portion; a soft sleeve covering the body portion which encapsulates material that can be cured using light; a light-emitting element; a connection to activate the light-emitting element to cure the material and provide a custom fit of the device to the ear canal of the wearer.

In Example 2, the subject matter of any of the examples herein may optionally include wherein the soft sleeve is non-adherent to the cured material so as to be slideable along the cured material and provide a comfortable fit for the wearer.

In Example 3, the subject matter of any of the examples herein may optionally include wherein the body portion of the device comprises a loudspeaker for conveying sound to the wearer.

In Example 4, the subject matter of any of the examples herein may optionally include wherein the body portion and sleeve are adapted to function as an ear plug to block external sounds.

In Example 5, the subject matter of any of the examples herein may optionally include wherein the body portion comprises a completely-in-canal hearing aid.

In Example 6, the subject matter of any of the examples herein may optionally include wherein the body portion comprises a receiver of a receiver-in-canal hearing aid.

In Example 7, the subject matter of any of the examples herein may optionally include wherein the soft sleeve is made of elastomeric material.

In Example 8, a method for custom fitting a device adapted to be inserted into the ear canal of a wearer comprises: covering a body portion of the device with a soft sleeve with a light-curable material interposed therebetween; inserting the soft sleeve and body portion into the wearer's ear canal; activating a light-emitting element on the body portion to cure the light-curable material custom fit the device to the ear canal of the wearer.

In Example 9, the subject matter of any of the examples herein may optionally include using the custom fitted device as an ear canal impression for making a final product.

In Example 10, the subject matter of any of the examples herein may optionally include wherein the body portion of the device comprises a loudspeaker for conveying sound to the wearer.

In Example 11, the subject matter of any of the examples herein may optionally include wherein the body portion and sleeve are adapted to function as an ear plug to block external sounds.

In Example 12, the subject matter of any of the examples herein may optionally include wherein the body portion comprises a completely-in-canal hearing aid.

In Example 13, the subject matter of any of the examples herein may optionally include wherein the body portion comprises a receiver of a receiver-in-canal hearing aid.

In Example 14, a device for a receiver-in-canal hearing aid comprises: a receiver connectable to a microphone and audio processing circuitry via a cable; a soft sleeve covering the receiver which encapsulates a light-curable material between the receiver and the soft sleeve; one or more light-emitting elements; and, a connection to activate the light-emitting element to cure the light-curable material and provide a custom fit of the receiver covered by the soft sleeve to the ear canal of a wearer.

In Example 15, the subject matter of any of the examples herein may optionally include a slip housing within which the receiver is slideably mounted; and wherein a distal end of the slip housing is connected to the soft sleeve and wherein a proximal end of the receiver is bonded to the soft sleeve so that as the device is inserted into a wearer's ear before the light curable material is cured, the receiver slides within the slip housing along a proximal to distal axis.

In Example 16, the subject matter of any of the examples herein may optionally include wherein the one or more light-emitting elements are mounted on the slip housing.

In Example 17, the subject matter of any of the examples herein may optionally include a wire cavity interposed between the distal end of the receiver and the distal end of the soft sleeve to allow wires from the receiver for connecting to the cable to gather as the receiver slides in a distal direction within the slip housing.

In Example 18, the subject matter of any of the examples herein may optionally include wherein the light-curable material is a photopolymer.

In Example 19, the subject matter of any of the examples herein may optionally include wherein the soft sleeve is made of elastomeric material.

In Example 20, the subject matter of any of the examples herein may optionally include wherein the one or more light emitting elements are ultra-violet light emitting diodes.

This application is intended to cover adaptations or variations of the present subject matter. It is to be understood that the above description is intended to be illustrative, and not restrictive. The scope of the present subject matter should be determined with reference to the appended claims, along with the full scope of legal equivalents to which such claims are entitled.

The invention claimed is:

1. A device for inserting into the ear canal of a wearer, comprising:
    a body portion;
    a soft sleeve covering the body portion which encapsulates material that can be cured using light;
    a light-emitting element;
    a connection to activate the light-emitting element to cure the material and provide a custom fit of the device to the ear canal of the wearer;
    wherein the soft sleeve is non-adherent to the cured material so as to be slideable along the cured material and provide a comfortable fit for the wearer;
    a slip housing within which the body portion is slideably mounted; and,
    wherein a distal end of the slip housing is connected to the soft sleeve and wherein a proximal end of the body portion is bonded to the soft sleeve so that as the device is inserted into a wearer's ear before the light curable material is cured, the body portion slides within the slip housing along a proximal to distal axis.

2. The device of claim 1 wherein the body portion of the device comprises a loudspeaker for conveying sound to the wearer.

3. The device of claim 1 wherein the body portion and sleeve are adapted to function as an ear plug to block external sounds.

4. The device of claim 1 wherein the body portion comprises a completely-in-canal hearing aid.

5. The device of claim 1 wherein the body portion comprises a receiver of a receiver-in-canal hearing aid.

6. The device of claim 1 wherein the soft sleeve is made of elastomeric material.

7. A method for custom fitting a device adapted to be inserted into the ear canal of a wearer, comprising:
    slideably mounting a body portion within a slip housing;
    covering the body portion of the device with a soft sleeve with a light-curable material interposed therebetween;
    inserting the soft sleeve and body portion into the wearer's ear canal;

activating a light-emitting element on the body portion to cure the light-curable material custom fit the device to the ear canal of the wearer;

wherein the soft sleeve is non-adherent to the cured material so as to be slideable along the cured material and provide a comfortable fit for the wearer; and, wherein a distal end of the slip housing is connected to the soft sleeve and wherein a proximal end of the body portion is bonded to the soft sleeve so that as the device is inserted into a wearer's ear before the light curable material is cured, the body portion slides within the slip housing along a proximal to distal axis.

8. The method of claim 7 further comprising using the custom fitted device as an ear canal impression for making a final product.

9. The method of claim 7 wherein the body portion of the device comprises a loudspeaker for conveying sound to the wearer.

10. The method of claim 7 wherein the body portion and sleeve are adapted to function as an ear plug to block external sounds.

11. The method of claim 7 wherein the body portion comprises a completely-in-canal hearing aid.

12. The method of claim 7 wherein the body portion comprises a receiver of a receiver-in-canal hearing aid.

13. A device for a receiver-in-canal hearing aid, comprising:

a receiver connectable to a microphone and audio processing circuitry via a cable;

a soft sleeve covering the receiver which encapsulates a light-curable material between the receiver and the soft sleeve;

one or more light-emitting elements; and, a connection to activate the light-emitting element to cure the light-curable material and provide a custom fit of the receiver covered by the soft sleeve to the ear canal of a wearer;

a slip housing within which the receiver is slideably mounted;

wherein a distal end of the slip housing is connected to the soft sleeve and wherein a proximal end of the receiver is bonded to the soft sleeve so that as the device is inserted into a wearer's ear before the light curable material is cured, the receiver slides within the slip housing along a proximal to distal axis.

14. The device of claim 13 wherein the one or more light-emitting elements are mounted on the slip housing.

15. The device of claim 13 further comprising a wire cavity interposed between the distal end of the receiver and the distal end of the soft sleeve to allow wires from the receiver for connecting to the cable to gather as the receiver slides in a distal direction within the slip housing.

16. The device of claim 13 wherein the light-curable material is a photopolymer.

17. The device of claim 13 wherein the soft sleeve is made of elastomeric material.

18. The device of claim 13 wherein the one or more light emitting elements are ultra-violet light emitting diodes.

* * * * *